(12) United States Patent
Sung et al.

(10) Patent No.: US 10,833,891 B2
(45) Date of Patent: Nov. 10, 2020

(54) METHODS AND SYSTEMS FOR TRANSMITTING INFORMATION PACKETS THROUGH TUNNEL GROUPS AT A NETWORK NODE

(71) Applicant: Pismo Labs Technology Limited, Kowloon (HK)

(72) Inventors: Patrick Ho Wai Sung, Kowloon (HK); Kam Chiu Ng, New Territories (HK); Wan Chun Leung, New Territories (HK); Ho Ming Chan, Quarry Bay (HK)

(73) Assignee: Pismo Labs Technology Limited, Kowloon (HK)

( * ) Notice: Subject to any disclaimer, the term of this patent is extended or adjusted under 35 U.S.C. 154(b) by 221 days.

(21) Appl. No.: 15/766,565

(22) PCT Filed: Feb. 11, 2017

(86) PCT No.: PCT/IB2017/050769
§ 371 (c)(1),
(2) Date: Apr. 6, 2018

(87) PCT Pub. No.: WO2018/146521
PCT Pub. Date: Aug. 16, 2018

(65) Prior Publication Data
US 2019/0089557 A1     Mar. 21, 2019

(51) Int. Cl.
*H04L 12/46* (2006.01)
*H04L 12/709* (2013.01)
(Continued)

(52) U.S. Cl.
CPC ........ *H04L 12/4633* (2013.01); *H04L 45/123* (2013.01); *H04L 45/245* (2013.01); *H04L 63/205* (2013.01)

(58) Field of Classification Search
CPC . H04L 12/4633; H04L 45/245; H04L 63/205; H04L 45/123; H04L 43/00
(Continued)

(56) References Cited

U.S. PATENT DOCUMENTS 6,320,848 B1 * 11/2001 Edwards ................. H04L 43/00
370/255
7,409,447 B1 * 8/2008 Assadzadeh ............ H04L 43/00
709/225
(Continued)

FOREIGN PATENT DOCUMENTS

CN      101056257 A    10/2007
CN      101340381 A    1/2009
(Continued)

OTHER PUBLICATIONS

International Search Report in International Application No. PCT/IB2017/050769, dated Aug. 8, 2017.
(Continued)

*Primary Examiner* — Taghi T Arani
*Assistant Examiner* — Badri Champakesan
(74) *Attorney, Agent, or Firm* — FisherBroyles, LLP

(57) ABSTRACT

The present invention discloses methods and systems for sending information packets from a first network node to a second network node. An aggregated tunnel is established between the first network node and the second network node. An information packet is determined whether to be sent according to profile condition(s) of the aggregated tunnel and then according to a selected policy. When a selected policy is selected and the information packet is sent through a tunnel according to the selected policy. When no policy is selected, the information packet is sent through one
(Continued)

of a first group of tunnels. When no profile is selected, the information packet is sent through a network interface of the first network node.

18 Claims, 15 Drawing Sheets

(51) Int. Cl.
*H04L 12/721* (2013.01)
*H04L 29/06* (2006.01)

(58) Field of Classification Search
USPC .............................................................. 726/1
See application file for complete search history.

(56) References Cited

U.S. PATENT DOCUMENTS

| | | | | |
|---|---|---|---|---|
| 8,490,148 | B2* | 7/2013 | Sikka | H04L 63/20 715/700 |
| 8,799,994 | B2* | 8/2014 | Barton | H04L 67/10 726/1 |
| 8,813,168 | B2* | 8/2014 | Riley | H04M 15/00 726/1 |
| 9,319,938 | B2* | 4/2016 | Sun | H04L 45/38 |
| 2005/0125490 | A1* | 6/2005 | Ramia | H04L 45/50 709/202 |
| 2005/0172241 | A1* | 8/2005 | Daniels | G06F 9/543 715/770 |
| 2009/0157875 | A1* | 6/2009 | Britton | H04L 43/00 709/224 |
| 2009/0168769 | A1* | 7/2009 | Lu | H04L 65/1069 370/389 |
| 2010/0182920 | A1* | 7/2010 | Matsuoka | H04L 43/00 370/252 |
| 2013/0091543 | A1* | 4/2013 | Wade | G06F 21/54 726/1 |
| 2015/0009991 | A1* | 1/2015 | Sung | H04W 76/12 370/392 |
| 2015/0326473 | A1* | 11/2015 | Dunbar | H04L 12/4633 370/392 |
| 2016/0191545 | A1* | 6/2016 | Nanda | H04L 43/028 726/1 |
| 2017/0019331 | A1* | 1/2017 | Yong | H04L 45/64 |
| 2017/0019339 | A1* | 1/2017 | Caputo | H04L 63/1425 |
| 2017/0180155 | A1* | 6/2017 | Shanks | H04L 12/4633 |
| 2017/0187548 | A1* | 6/2017 | Pakhomov | H04L 69/326 |
| 2018/0054418 | A1* | 2/2018 | El Defrawy | H04L 63/0245 |
| 2018/0159702 | A1* | 6/2018 | Song | H04L 45/583 |

FOREIGN PATENT DOCUMENTS

| | | |
|---|---|---|
| CN | 101815027 A | 8/2010 |
| CN | 102882805 A | 1/2013 |
| CN | 103155501 A | 6/2013 |
| CN | 103595567 A | 2/2014 |
| CN | 106254202 A | 12/2016 |

OTHER PUBLICATIONS

Written Opinion of the international Searching Authority in International Application No. PCT/IB2017/050769, dated Aug. 8, 2017.

* cited by examiner

|  | First Profile | Second Profile |
|---|---|---|
| Local IP Address | 123.23.2.1 | 45.56.67.78 |
| Remote IP Address | 98.76.54.3 | 8.7.6.5 |
| Encryption standard | AES 128 | Unencrypted |
| WAN selection | WAN 121 WAN 122 WAN 123 | WAN 121 WAN 123 |
| Shared Key | "happy" | ----- |

(Prior art)

Fig. 1

| Profile | First Profile | | |
|---|---|---|---|
| Local ID | Gateway 201 | | |
| Remote ID | Gateway 251 | | |
| | 517 | 518 | 519 |
| Policy | Default | First policy | Second policy |
| Local WAN Selection | WAN interface 1<br><br>WAN interface 2<br><br>WAN interface 3 | WAN interface 2 | WAN interface 2<br><br>WAN interface 3 |
| Encryption standard | AES 128 | AES 256 | ---- |
| Shared Key | "happy" | "unhappy" | ---- |
| Condition | Default | FTP | VoIP |
| Priority level | | Lowest | Highest |

510

511 — Profile row
512 — Remote ID row
513 — Local WAN Selection row
514 — Encryption standard row
515 — Shared Key row
516 — Condition row
530 — Priority level row

Fig. 5A

| | | 530 | | |
|---|---|---|---|---|
| 511 Profile | | First Profile | | |
| Local ID | | Gateway 201 | | |
| 512 Remote ID | | Gateway 251 | | |
| | | 547 | 548 | 549 |
| Policy | | Default | First policy | Second policy |
| 513 Local WAN Selection | | WAN interface 1<br>WAN interface 2<br>WAN interface 3 | WAN interface 2 | WAN interface 2<br>WAN interface 3 |
| 544 Remote WAN selection | | WAN interface 5<br>WAN interface 6 | WAN interface 5 | WAN interface 5<br>WAN interface 6 |
| 514 Encryption standard | | AES 128 | AES 256 | --- |
| 515 Shared Key | | "happy" | "unhappy" | --- |
| 516 Condition | | Default | FTP | 1. VoIP<br>2. Laptop 263 |
| 530 Priority level | | | Lowest | Highest |

Fig. 5C

| | | First Policy 551 | Second Policy 552 |
|---|---|---|---|
| 516 Condition | 1. DATA TYPE | FTP | VOIP |
| | 2. SOURCE | DESKTOP 212 | LAPTOP 214 |
| | 3. DESTINATION | SERVER 262 | SERVER 265 |
| | 4. TIME OF DAY | 8 AM - 8 PM | 24 HOURS |
| 530 Priority Level | | LOWEST | HIGHEST |
| 511 Profile | | First Profile 553 | Second Profile 554 |
| 512 Local ID | | Gateway 201 | Gateway 201 |
| 514 Remote ID | | Gateway 251 | Gateway 252 |
| Encryption Standard | | AES 256 | AES 128 |
| 515 Shared Key | | "happy" | "unhappy" |
| 533 Tunnel Selection | | Tunnel: E<br>Tunnel: F | Tunnel: G<br>Tunnel: H<br>Tunnel: I<br>Tunnel: J |

FIG. 5D

METHODS AND SYSTEMS FOR TRANSMITTING INFORMATION PACKETS THROUGH TUNNEL GROUPS AT A NETWORK NODE

TECHNICAL FIELD

The present invention relates in general to the field of computer networks. More particularly, the present invention relates to a method carried out by a first node and a second node to transmit and receive data concurrently through multiple tunnel groups.

BACKGROUND ART

When a first network node has multiple wide-area-network (WAN) network interfaces connecting to multiple communication links, the first network node is able to form multiple tunnels with a second network node for data communication. As not all information packets require the same network performance and/or network reliability to be sent from the first network node to the second network node, it may not be preferred that the first network node sends the information packets indiscriminately.

U.S. Pat. No. 9,019,827 disclosed embodiments on optimizing throughput of aggregated tunnels over multiple variable bandwidth tunnels by adjusting a tunnel bandwidth weighting schema during a data transfer session in response to a change in bandwidth capabilities of one or more tunnels. When there are multiple aggregated tunnels, U.S. Pat. No. 9,019,827 did not disclose how to distribute information packets according to the requirements of the information packets over the tunnels.

FIG. 1 illustrates a prior-art of two profiles used to set up tunnels at a gateway with two remote IP addresses. Those who are skilled in the arts would appreciate different techniques to utilize the two profiles. Particularly, an aggregated tunnel, like the one described in U.S. Pat. No. 9,019,927, is able to be established using information in the first profile with three wide area network (WAN) network interfaces.

DISCLOSURE OF INVENTION

Summary

The present invention discloses methods and systems for sending information packets from a first network node to a second network node. An aggregated tunnel is established between the first network node and the second network node. The aggregated tunnel is comprised of at least two tunnels, and at least one of the first network node and second network node has two network interfaces. In order to send an information packet, it is first determined whether an information packet is to be sent according to profile condition(s) of the aggregated tunnel. When all profile condition(s) are satisfied it is determined whether all conditions of at least one policy is satisfied. When all conditions of at least one policy are satisfied, a selected policy is selected and the information packet is sent through a tunnel according to the selected policy. When not all conditions of a policy are satisfied, the information packet is sent through one of a first group of tunnels. When not all profile condition(s) are satisfied, the information packet is sent through a network interface of the first network node.

According to one of the embodiments, the selected policy has the highest priority among the at least one of the policies satisfied.

According to one of the embodiments, the tunnel is selected from a plurality of tunnels corresponding to the selected policy.

According to one of the embodiments, the policies are entered by a user. In another embodiment, the policies are retrieved from a remote server.

According to one of the embodiments, a policy is satisfied when all conditions of the policy are satisfied. In another embodiment, the conditions are selected from the group consisting of source address of the information packets, destination address of the information packets, and payload of the information packets.

According to one of the embodiments, the first network node comprises a plurality of network ports and the tunnels are established using communication links connected to the network ports. In another embodiment, the first network node comprises a plurality of cellular communication modules and the tunnels are established using network interfaces provided by the plurality of cellular communication modules.

According to one of the embodiments, the present invention further discloses selecting a tunnel of the selected aggregated tunnel for sending each of the information packets. The selection of a tunnel of the selected aggregated tunnel for sending each of the information packets is performed when all profile conditions are satisfied.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

FIG. 1 illustrates a prior art two profiles used to set up tunnels at a gateway with two remote IP addresses.

FIG. 5A illustrates a table of how different profiles and policies are defined according to one of the embodiments of the present invention.

FIG. 5C illustrates a table of how different profiles and policies are defined according to one of the embodiments of the present invention.

FIG. 5D illustrates a table of how different profiles and policies are defined according to one of the embodiments of the present invention.

DETAILED DESCRIPTION

Figure 2:
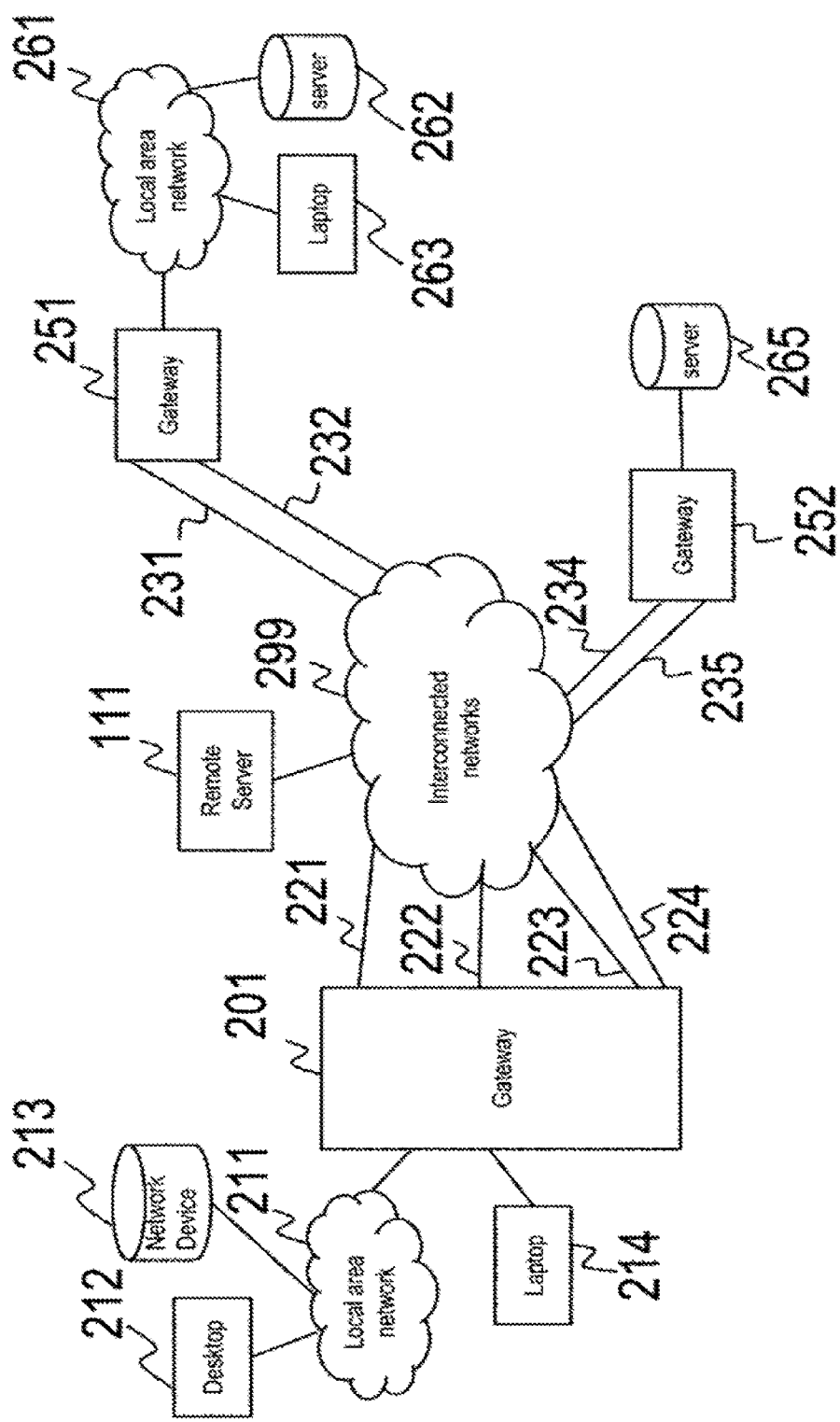
FIG. 2 illustrates a network diagram where a plurality of network gateways can be connected together

The ensuing description provides preferred exemplary embodiment(s) only, and is not intended to limit the scope, applicability or configuration of the invention. Rather, the ensuing description of the preferred exemplary embodiment(s) will provide those skilled in the art with an enabling description for implementing a preferred exemplary embodiment of the invention. It being understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but could have additional steps not included in the figure. A process may correspond to a method, a function, a procedure, a subroutine, a subprogram, etc. When a process corresponds to a function, its termination corresponds to a return of the function to the calling function or the main function.

Embodiments, or portions thereof, may be embodied in program instructions operable upon a processing unit for performing functions and operations as described herein. The program instructions making up the various embodiments may be stored in a non-transitory storage medium. Moreover, as disclosed herein, the term "non-transitory storage medium" may represent one or more devices for storing data, including read only memory (ROM), programmable read-only memory (PROM), erasable programmable read-only memory (EPROM), random access memory (RAM), magnetic RAM, core memory, floppy disk, flexible disk, hard disk, magnetic tape, CD-ROM, flash memory devices, a memory card and/or other machine readable mediums for storing information. The term "machine-readable medium" includes but is not limited to portable or fixed storage devices, optical storage mediums, magnetic mediums, memory chips or cartridges, wireless channels and various other mediums capable of storing, containing or carrying instruction(s) and/or data. A machine-readable medium can be realized by virtualization and can be a virtual machine readable medium including a virtual machine readable medium in a cloud-based instance.

The term "non-transitory computer-readable medium", "main memory", or "secondary storage", as used herein refers to any medium that participates in providing instructions to a processing unit for execution. The computer-readable medium is just one example of a machine-readable medium, which may carry instructions for implementing any of the methods and/or techniques described herein. Such a medium may take many forms, including but not limited to, non-volatile media, volatile media, and transmission media. Non-volatile media includes, for example, optical or magnetic disks. Volatile media includes dynamic memory. Transmission media includes coaxial cables, copper wire and fiber optics. Transmission media can also take the form of acoustic or light waves, such as those generated during radio-wave and infrared data communications.

A volatile storage may be used for storing temporary variables or other intermediate information during execution of instructions by processor/processing unit. A non-volatile storage or static storage may be used for storing static information and instructions for processor, as well as various system configuration parameters.

The storage medium may include a number of software modules that may be implemented as software code to be executed by the processing unit using any suitable computer instruction type. The software code may be stored as a series of instructions or commands, or as a program in the storage medium.

Various forms of computer readable media may be involved in carrying one or more sequences of one or more instructions to the processor for execution. For example, the instructions may initially be carried on a magnetic disk from a remote computer. Alternatively, a remote computer can load the instructions into its dynamic memory and send the instructions to the system that runs the one or more sequences of one or more instructions.

A processing unit may be a microprocessor, a microcontroller, a digital signal processor (DSP), any combination of those devices, or any other circuitry configured to process information.

A processing unit executes program instructions or code segments for implementing embodiments of the present invention. Furthermore, embodiments may be implemented by hardware, software, firmware, middleware, microcode, hardware description languages, or any combination thereof. When implemented in software, firmware, middleware or microcode, the program instructions to perform the necessary tasks may be stored in a computer readable storage medium. A processing unit(s) can be realized by virtualization and can be a virtual processing unit(s) including a virtual processing unit in a cloud-based instance.

Embodiments of the present invention are related to the use of a computer system for implementing the techniques described herein. In an embodiment, the inventive processing units may reside on a machine such as a computer platform. According to one embodiment of the invention, the techniques described herein are performed by computer system in response to the processing unit executing one or more sequences of one or more instructions contained in the volatile memory. Such instructions may be read into the volatile memory from another computer-readable medium. Execution of the sequences of instructions contained in the volatile memory causes the processing unit to perform the process steps described herein. In alternative embodiments, hard-wired circuitry may be used in place of or in combination with software instructions to implement the invention. Thus, embodiments of the invention are not limited to any specific combination of hardware circuitry and software.

A code segment, such as program instructions, may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Alternatively, hardwired circuitry may be used in place of, or in combination with, software instructions to implement processes consistent with the principles of the invention. Thus, implementations consistent with principles of the invention are not limited to any specific combination of hardware circuitry and software.

A network interface may be implemented by a standalone electronic component or may be integrated with other electronic components. A network interface may have no network connection or at least one network connection depending on the configuration. A network interface may be an Ethernet interface, a wireless communication interface, a frame relay interface, a fibre optic interface, a cable interface, a Digital Subscriber Line (DSL) interface, a token ring interface, a serial bus interface, a universal serial bus (USB) interface, Firewire interface, Peripheral Component Interconnect (PCI) interface, etc.

A network interface may connect to a wired or wireless access network. An access network may carry one or more network protocol data. A wired access network may be implemented using Ethernet, fiber optic, cable, DSL, frame relay, token ring, serial bus, USB, Firewire, PCI, or any material that can pass information. A wireless access network may be implemented using infrared, High-Speed Packet Access (HSPA), HSPA+, Long Term Evolution (LTE), WiMax, GPRS, EDGE, GSM, CDMA, WiFi, CDMA2000, WCDMA, TD-SCDMA, BLUETOOTH, WiBRO, Evolution-Data Optimized (EV-DO); Digital Enhanced Cordless Telecommunications (DECT); Digital AMPS (IS-136/TDMA); Integrated Digital Enhanced (iDEN) or any other wireless technologies.

Embodiments, or portions thereof, may be embodied in a computer data signal, which may be in any suitable form for communication over a transmission medium such that it is readable for execution by a functional device (e.g., processing unit) for performing the operations described herein. The computer data signal may include any binary digital electronic signal that can propagate over a transmission medium such as electronic network channels, optical fibers, air, electromagnetic media, radio frequency (RF) links, and the like, and thus the data signal may be in the form of an electrical signal, optical signal, radio frequency or other wireless communication signal, etc. The code segments may, in certain embodiments, be downloaded via computer networks such as the Internet, an intranet, LAN, MAN, WAN, the PSTN, a satellite communication system, a cable transmission system, and/or the like.

According to one of the embodiments of the present invention, FIG. 2 illustrates a network topology where a plurality of network gateways can be connected together via groups of communication links. There is no limitation to the number of gateways or network devices that can be connected together. Layer 2 network protocols that can be employed in the present invention include Ethernet, Token-ring, Frame Relay, PPP, X.25 and ATM. Layer 3 network protocols that can be employed in the present invention include Internet Protocol (IP) version 4 (IPv4), IPv6, mobile IPv4, and mobile IPv6.

Desktop 212 and network device 213 are in the same local area network (LAN) 211. Network device 213 is an electronic device that has networking capability, including web-server, database-server or network-attached storage (NAS) device. LAN 211 and laptop 214 are connected to gateway 201. Gateway 201 has a plurality of network ports. One network port is capable of being connected to one communication link. There are many choices for form factors of a network port, including a RJ45 port or a USB port. Communication links 221, 222, 223 and 224 are connected to WAN network interfaces of gateway 201. One or more communication links 221, 222, 223 and 224 can be used by gateway 201 to connect to interconnected network 299, such as the Internet.

In another example, gateway 201 is a wireless communication device and comprises a plurality of wireless communication modules. The wireless communication modules allow gateway 201 to connect to the Internet through wireless communication services provided by one or more wireless service providers or cellular service providers. For illustration purpose, communication links 221 and 222 are established using LTE technology through two cellular communication modules and communication link 223 and 224 is established using 3G technology through another two cellular communication modules. The cellular communication modules are placed inside gateway 201 or coupled externally to gateway 201. There is no limitation that wireless communication modules must be cellular communication modules using 3G or LTE technologies. For example, satellite modems and WiMAX modems can be used. Gateway 201 also has the capability to use Wi-Fi as one or more of its communication links.

Server 262 and laptop 263 are in the same LAN 261. LAN 261 is connected to gateway 251. Communication links 231 and 232 are used by gateway 251 concurrently to connect to interconnected network 299. For example, communication links 231 and 232 are established using Ethernet links. Server 265 is connected to gateway 252. Gateway 252 is connected to interconnected network 299 using communication links 234 and 235. For illustration purpose, communication links 234 and 235 are both fiber optic links.

Remote server 111 is a storage device that connects to interconnected network 299. Those who are skilled in the art would appreciate that connections between a source node, such as gateway 201 and a destination node, such as gateway 251 or gateway 252, can be established using end-to-end connection-oriented protocol, such as TCP. In the present invention, a tunnel, including VPN, is a connection that carries information packets by encapsulation. In a preferred embodiment, tunnels are established between gateways, such as 201 and 251, and not between endpoint devices, such as desktop 212 and server 262.

Figure 6:
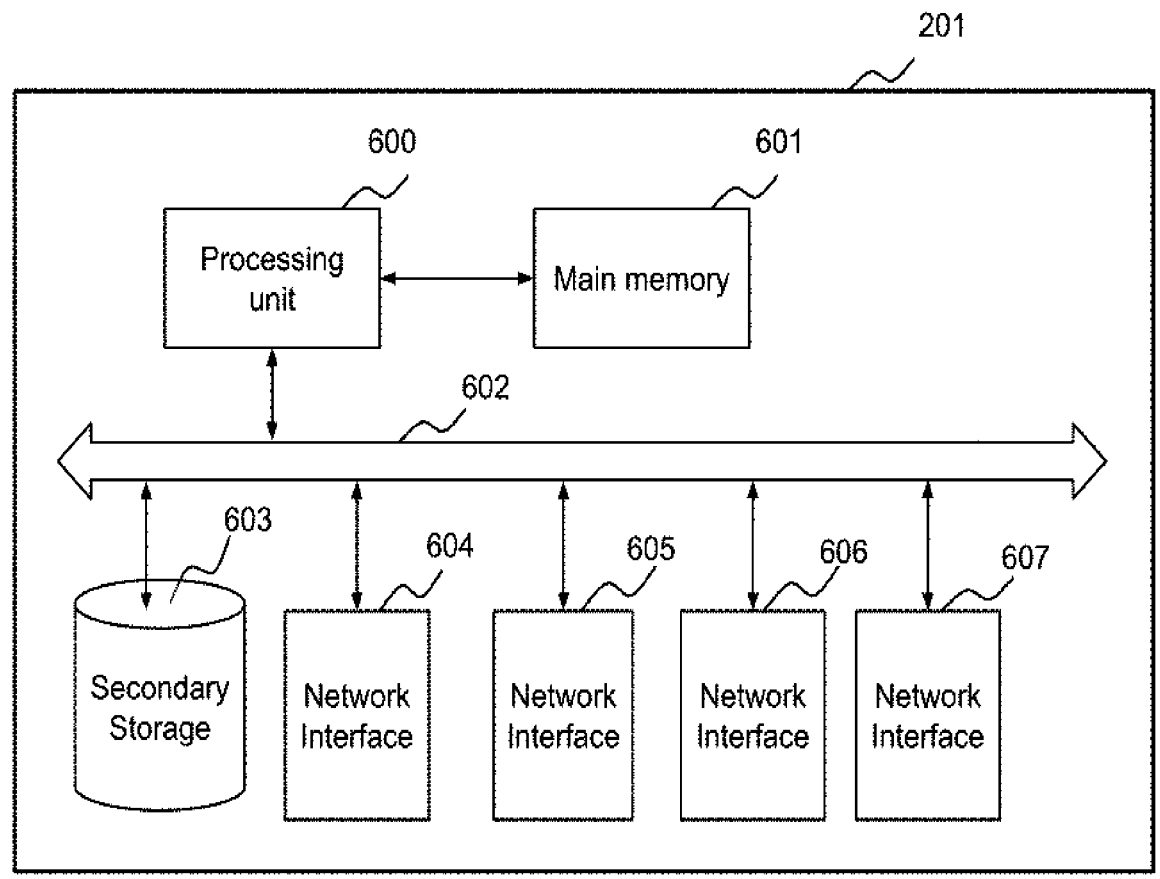
FIG. 6 illustrates block diagram of a gateway according to one of the embodiments of the present invention.

FIG. 6 is an illustrative block diagram of a gateway, such as gateway 201, according to one of the embodiments of the present invention. Gateway 201 comprises processing unit 600, main memory 601, system bus 602, secondary storage 603, and network interfaces 604, 605, 606 and 607. Processing unit 600 and main memory 601 are connected to each other directly. Processing unit 600 is connected to secondary storage 603 and network interfaces 604, 605, 606 and 607 through system bus 602. One of the benefits of using system bus 602 is to allow management server 111 to have increased modularity. System bus 602 can be any of several types of bus structures including a memory bus, a peripheral bus, and a local bus using any of a variety of bus architectures. Secondary storage 603 stores program instructions for execution by processing unit 600. The scope of the invention is not restricted to gateway 201 having four network interfaces, such that gateway 201 is allowed to have network interfaces higher or below this number.

A communication link connects a network interface of a gateway or network device to interconnected networks, such as the Internet. The network interface can be an Ethernet interface, a 3G network interface, a 4G network interface, a WiMAX network interface, or any other network interface of a network device. A network interface can also be a virtual network interface of a virtual machine (VM). A communication link is in form of optical fiber, Ethernet, ATM, Frame Relay, T1/E1, IPv4, IPv6, wireless technologies, Wi-Fi, WiMAX, High-Speed Packet Access technology, 3GPP Long Term Evolution (LTE) or the like.

A gateway is a device or a node on a network which performs protocol conversion between different types of networks or applications. A gateway also performs network address and port address translation and is capable of allowing an end-to-end connection to be established. The term gateway is not meant to be limited to a single type of device, as any device, hardware or software, that acts as a bridge between the user and the networks is be considered a gateway for purposes of this application. The gateway couples with a plurality of multiple networks. A router, a switch, a bridge, a wireless access point, a virtual machine in a computing device or an access point may all be considered as a gateway for purposes of this invention. According to the present invention, the gateway comprises at least two network interfaces.

An end-to-end connection is a connection between a source node and a destination node. An end-to-end connection may include one or more communication links and one or more intermediate nodes. In one of the embodiments of the present invention, an end-to-end connection between a source node and a destination node is a virtual private network (VPN) tunnel.

A tunnel is an end-to-end connection established between two gateways using their respective tunnel interfaces and one or more communication links. A tunnel is established using a tunneling-protocol that encapsulates one type of protocol data unit (PDU) into another type of protocol data unit. Examples of tunneling-protocol include, but are not limited to, Generic Routing Encapsulation (GRE) and Layer-2 Tunneling Protocol (L2TP). A tunnel creates a virtual point-to-point connection between two network nodes. Tunnels may or may not encrypt the encapsulated Protocol Data Unit such as an IP packet. More than one tunnel interface can be established using the same network interface of a gateway. The two gateways on each end of a tunnel may be directly connected or may be connected through one or more interconnected networks.

An information packet is a Protocol Data Unit (PDU) that contains control information, such as address information, and user data. An information packet can be a network layer PDU such as Internet Protocol (IPv4 or IPv6), a transport layer PDU such as Transmission Control Protocol (TCP) or User Datagram Protocol (UDP), or PDU of any other protocol that is capable of carrying information over a communication link.

In one embodiment of the present invention, when tunnels are used to send encapsulated information packets, one encapsulated information packet is sent through one tunnel. If an encapsulated information packet cannot be sent through the tunnel selected for this transmission, due to limitation of Maximum Transmission Unit (MTU), the encapsulated information packet is dropped. In another embodiment, if an encapsulated information packet cannot be sent through the selected tunnel, processing unit 600 fragments the encapsulated information packet. The fragments of the encapsulated information packet are then sent through one or more tunnels of the aggregated tunnel the selected tunnel belongs to.

A profile stores connection information related to one or more tunnels between two devices such as gateways 201 and gateway 251. A profile to which an information packet belongs to may be determined by the processing unit of a gateway, at least in part, according to the source address, destination address and encryption standard of the information packet. Profiles may also comprise authentication information, details of digital certificates, or any other information used in establishing tunnels between two sites. A profile may be defined by a user or administrator of gateway 201 or gateway 251. Both gateways 201 and 251 may have profiles containing the same information in order to establish the one or more tunnels. Profiles are also used to create aggregated tunnels.

An aggregated tunnel comprises a group of tunnels that correspond to the same profile. Each aggregated tunnel is established using individual tunnel-profiles. In one embodiment of the present invention, the number of aggregated tunnel established between two network nodes is limited to one. In another embodiment of the present invention, the number of aggregated tunnels established between two network nodes can be two or more. The advantage of using a plurality of aggregated tunnels between two network nodes is having the ability to add or remove aggregated tunnels without interrupting ongoing communication through other aggregated tunnel(s). Another benefit of having multiple aggregated tunnels between two gateways is to have the flexibility to distribute information packets through different aggregated tunnels according to the Quality-of-Service (QoS) requirements of the information packet or according to the configuration of the gateway. Such separation may increase network security and granular QoS configuration. On the other hand, as computing resources are needed to manage aggregated tunnels, using more aggregated tunnels will increase the requirements of computing resources of a network node. Therefore, using only one aggregated tunnel between two gateways reduces computing resource requirements.

According to various embodiments of the present invention, one or more outbound traffic policies may be defined by a user or administrator of gateway 201 or gateway 251. Conditions of an outbound traffic policy may be based on, but not limited to, the protocol of the information packet, source and/or destination port number of the information packet if the information packet is a TCP or UDP segment, the source and/or destination address of the information packet if the information packet is an IP packet, type or content of the application layer data, or the time of day. Processing unit 600 may determine whether an information packet satisfies conditions of an outbound traffic policy, and then process the information packet according to the policy. If condition(s) of a plurality of outbound traffic policies are satisfied by an information packet, a policy is selected from that plurality of outbound traffic policies based on, but not limited to, round-robin or random-selection. If the method of selection is network performance, then priority of the outbound traffic policy can be based on, but not limited to, QoS parameters such as throughput-rate, latency or hop-count of the communication links corresponding to the outbound traffic policy. Another selection method is to select the policy with highest priority and priority is set by a user, an administrator, or retrieved from a remote server. These selection mechanisms can be configured by the manufacturer, administrator or a user of the network device.

According to one of the embodiments of the present invention, profiles and policies are retrieved from a remote server 111 by network nodes such as gateway 201, gateway 251 or gateway 252. Remote server 111 is capable of storing the profiles and policies in a storage medium. Network nodes such as gateway 201, gateway 251 or gateway 252 can connect to remote server 111 to retrieve profiles and policies when either initiated by a system administrator, user by a software script. Retrieval of profiles or policies can also be triggered dynamically when some change in the network environment takes place. Remote server 111 is also capable of retrieving profiles and/or policies from the network nodes. In one variant of the present invention, remote management server 111 connects directly to a network interface of a network node.

According to another embodiment, remote server 111 is also a management server which is used by a system administrator or user to configure various systems of network nodes such as gateway 201, gateway 251 or gateway 252. Remote server 111 comprises a terminal through which a user or administrator may add, delete or modify a profile and/or a policy of the network nodes. A terminal may comprise a display, such as a cathode ray tube (CRT), plasma display, or a liquid crystal display (LCD), for displaying information to an administrator or user of the terminal. A terminal may also comprise an input device to allow the administrator or user of the terminal to communicate information and commands to a processing unit. Administrator or user of remote server 111 can configure systems of the network nodes remotely using terminal emulation programs like Telnet or SSH, or through webpages using HTTP or HTTPS. There is no restriction on remote server 111 on using any usable programs or software to configure the nodes. In one variant remote server 111 can be any computing device such as a desktop computer, a laptop computer, a mobile phone, a smartphone, a personal digital assistant, or any other electronic device that is capable of connecting to a network interface.

Figure 7A:
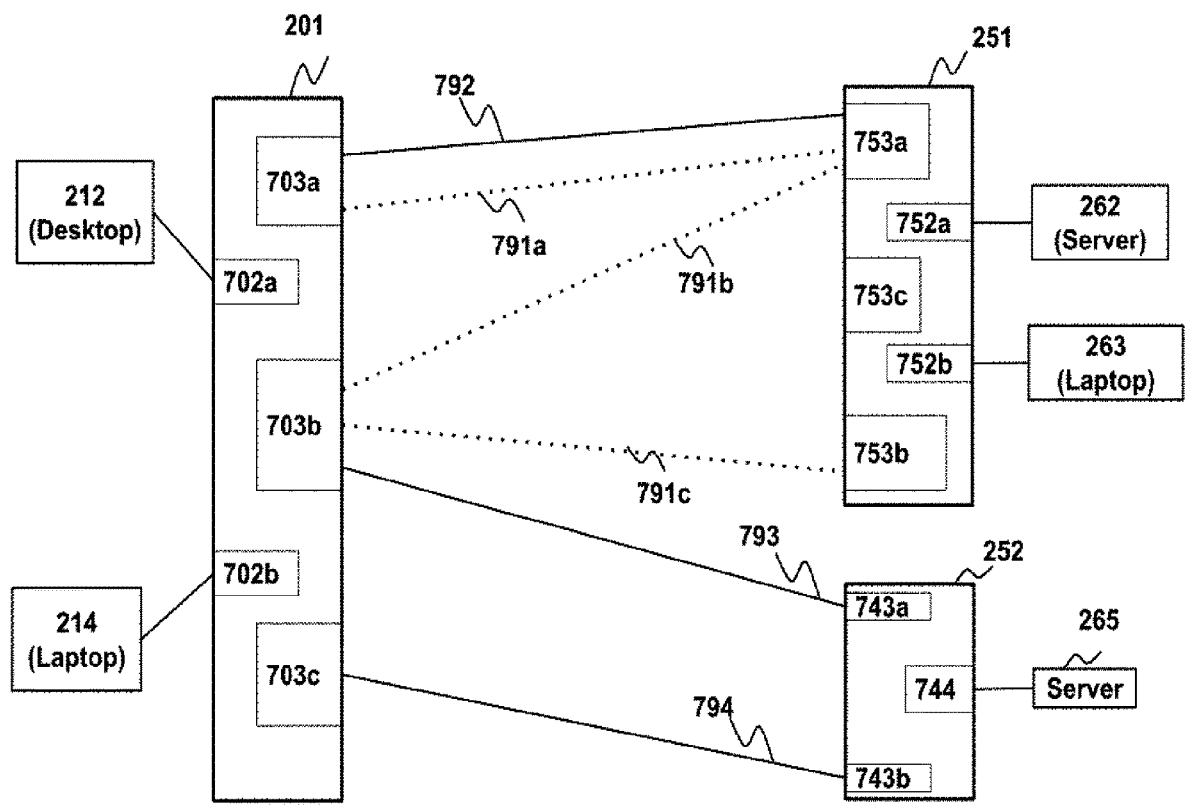
FIG. 7A illustrates a method used to send and receive information packets between gateways using a single tunnel-profile.

FIG. 7A is a block diagram of a network configuration according to one of the embodiments of the present invention. In this embodiment the number of tunnel-profile used by gateway 201 to communicate with gateway 251 is one. Therefore, the number of aggregated tunnel used between these two gateways is also one. For illustration purpose, gateway 201 connects to gateway 251 via a plurality of tunnels 791a, 791b and 791c and a connection 792. Aggregated tunnel 791 comprises tunnels 791a, 791b and 791c. Aggregated tunnel 791 is the only aggregated tunnel between the two nodes.

When an information packet is sent from gateway 201 to gateway 251, gateway 201 first determines whether the aggregated tunnel 791 should be used to send the information packet. When gateway 201 receives an information packet destined for laptop 263 from desktop computer 212, gateway 201 first checks if the information packet satisfies condition of the tunnel-profile. For example, condition of the tunnel-profile is destination address. Therefore, the information packet satisfies condition of the tunnel-profile and aggregated tunnel 791 is used to send the information packet. Gateway 201 then uses one of tunnels 791a-c, according to a determined outbound traffic policy to send the information packet to the gateway 251.

In one variant, connection 792 can be used to send and receive information packets when aggregated tunnel 791 cannot be used. In this variant connection 792 can be either a tunnel or connectionless WAN link.

In another variant, gateway 201 does not contain a profile to establish an aggregated tunnel for communication between gateway 201 and gateway 252. Therefore, when gateway 201 receives an information packet from laptop computer 214 that is destined to server 265, gateway 201 cannot use any aggregated tunnel to send this information packet because server 265 is connected to gateway 252. Therefore gateway 201 uses one or more connections 793 or 794 to send this information packet to gateway 252.

Figure 7B:
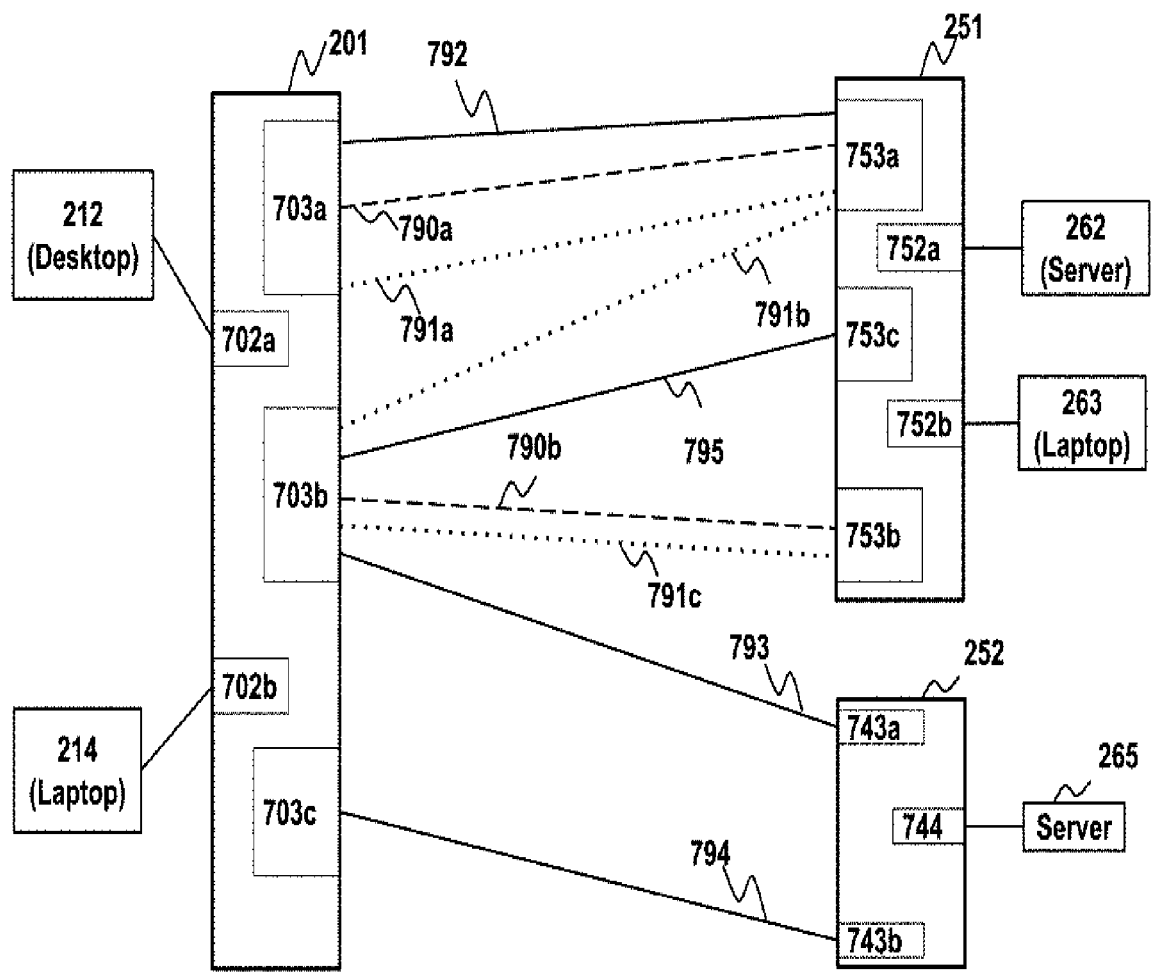
FIG. 7B illustrates a method used to send and receive information packets between gateways using multiple tunnel-profiles.

FIG. 7B is a block diagram of a network configuration according to another embodiment of the present invention. In this embodiment the number of tunnel-profiles used can be more than one. Therefore, the number of aggregated tunnels used between the two gateways to send and receive information packets can also be more than one.

For illustration purpose, gateway 201 connects to gateway 251 through a first group of connections 792 and 795, and a plurality of tunnels 790a, 790b, 791a, 791b, 791c. A first aggregated tunnel 790 comprises a first group of tunnels 790a and 790b. A second aggregated tunnel 791 comprises a second group of tunnels 791a, 791b and 791c. There is no limitation that there can only be two aggregated tunnels. One of the benefits of having multiple aggregated tunnels between two gateways is to have flexibility to send information packets that are most suited for one particular aggregated tunnel. Using the illustration in FIG. 2 as an example, communication links 221 and 222 are faster and have lower latency than that of communication links 223 and 224. Administrator of gateway 201 may prefer to use tunnels of an aggregated tunnel established through communication links 221 and 222 for critical information packets, such as information packets for augmented reality or video conferencing, while using slower communication links 223 and 224 for non-critical information packets, such as web browsing of entertainment news web sites.

Another benefit is the ability to add and remove one aggregated tunnel without interruption of other aggregated tunnels. For example, it is possible to establish a third aggregated tunnel comprising connections 792 and 795, when a video conferencing needs to be conducted. Information packets for the video conferencing can then be separated from information packets carried through the first and second aggregated tunnels. Such separation may increase network security and provide granular QoS configuration.

Aggregated tunnels are established according to its corresponding profile. For example, the first aggregated tunnel is established using a first tunnel profile while the second aggregated tunnel is established using a second tunnel profile. Tunnels 790a and 790b are established using WAN network interfaces 703a with 753a and WAN network interfaces 703b with 753b respectively. Tunnels 791a, 791b and 791c are established using WAN network interfaces 703a with 753a, 703b with 753a and 703b with 753b respectively. Connections 792, 793, 794 and 795 are established using WAN network interfaces 703a with 753a, 703b with 743a, 703c with 743b and 703b with 753c respectively. Comparing to the tunnels used in the first and second aggregated tunnels, there is no limitation that the connection 792 must be a tunnel. Connection 792 can use a connection-oriented protocol, such as TCP, or a connectionless protocol, such as UDP, to send information packets to gateway 251.

In one variant, the first group of communication links is the default group of communication links being used when no other groups of tunnels are allowed to be or capable of being used. Therefore, when the first and second aggregated tunnels are not used, information packets designated to gateway 251 will be sent through the first group of communication links comprising connections 792 and 795.

According to one of the embodiments of the present invention, the first node receives the first information packet through one of its LAN interfaces from a host. The first node then encapsulates the first information packet into first encapsulated information packet. The first node then sends the first encapsulated information packet to the second node through a first aggregated tunnel. In this particular embodiment, the first aggregated tunnel is the only aggregated tunnel between the two nodes. The second node receives the encapsulated first information packet from the first node through the first aggregated tunnel. The second node then decapsulates the encapsulated first information packet to first information packet and then sends the first information packet to a destination host through the corresponding LAN interface of the destination host. The second node receives the second information packet from one of its LAN interfaces and then encapsulates the second information packet into encapsulated second information packet. The second node then sends the encapsulated second information packet to the first node through the first aggregated tunnel. After receiving the encapsulated second information packet from the second node through the first aggregated tunnel, the first node decapsulates the encapsulated second information packet to second information packet and then sends it to the originating host of the first information packet through the corresponding LAN interface the first information packet was received from.

In one of the embodiments of the present invention, a first group of communication links are a subset of the plurality of communication links that exist between two nodes. This first group of communication links are used when the aggregated tunnel cannot be used to send the information packet to the second node. A second group of communication links is another subset of the plurality of communication links that exist between the two nodes. This second group of communication links are used to establish a first group of tunnels. Each tunnel of this first group of tunnels established between a WAN network interface of a gateway or network node to another WAN network interface of another gateway or network node. A first aggregated tunnel comprises the first group of tunnels. The first aggregated tunnel is determined according to a first tunnel-profile.

When the first node receives an information packet from a LAN host, it first checks if the information packet satisfies condition(s) of the first profile. In this embodiment the first profile is the only profile used by the first node. Therefore, only one aggregated tunnel is established between the two nodes. Further, in this embodiment, more than one outbound traffic policies can correspond to the first profile and profile condition(s) are checked before the outbound traffic policy condition(s). If the information packet satisfies condition(s) of the profile, the first node then checks if the information packet satisfies condition(s) of at least one outbound traffic policy corresponding to the first profile. An outbound traffic policy may have more than one condition. An outbound traffic policy is satisfied if all of its conditions are satisfied. If none of the outbound traffic policy is satisfied, then the first node selects a tunnel from the first group of tunnels specified in the profile to send the packet to the second node. In one variant, a particular tunnel is used to send the information packet when none of the outbound traffic policies is used. This particular tunnel is preferred to be a slower tunnel than other tunnels and not to be used by other aggregated tunnels. This particular tunnel is a last resort choice for sending non-critical information packets.

If condition(s) of at least one outbound traffic policy is satisfied, the first node then determines the applicable outbound traffic policy for the information packet. If there are more than one outbound traffic policy with condition(s) satisfied, the first node then selects one outbound traffic policy among all applicable outbound traffic policies for the information packet. The selection methodology of one outbound traffic policy among all applicable outbound traffic policies is based on priority. After determining the outbound traffic policy to apply to the information packet, the first node then uses a second tunnel specified in the first profile, corresponding to the selected outbound traffic policy to send the information packet. The second tunnel may or may not be same as the first tunnel. In one variant of this embodiment, if condition(s) of the profile is not satisfied, the first node then uses one or more communication links not specified in the first profile to send the information packet. In another variant of the present embodiment, the communication link(s) used to send the information packet when condition(s) of the profile is not satisfied may be same as the communication links used to establish the first or second group of tunnels.

In another embodiment of the present invention, more than one aggregated tunnel can be used for communication between two nodes. The plurality of aggregated tunnels between two nodes can be established and run concurrently to send and receive information packets. Each aggregated tunnel is established according to a different profile and each profile can have only one outbound traffic policy corresponding to it. When the first node receives an information packet from a LAN host, it first checks if the information packet satisfies condition(s) of at least one outbound traffic policy. If condition(s) of at least one outbound traffic policy is satisfied by the information packet, the first node then determines the applicable outbound traffic policy for the information packet. If there are more than one outbound traffic policy with condition(s) satisfied, the first node then selects one outbound traffic policy among all the applicable outbound traffic policies. The selection methodology of one outbound traffic policy among all applicable outbound traffic policies is based on priority.

For example, processing unit of the first node determines to use the first outbound traffic policy, the first node uses the first aggregated tunnel to send the information packet to the second node. The first aggregated tunnel is specified in the first profile corresponding to the determined first outbound traffic policy. In one variant of this embodiment, if none of the outbound traffic policy is satisfied by the first information packet, then the first node uses one or more communication links not specified in any profile to send the information packet. In another variant of the present embodiment, when condition(s) of at least one outbound traffic policy is not satisfied, the communication link(s) used to send the information packet may be same as the communication links used to establish the first or second group of tunnels.

An aggregated tunnel may comprise one, more than one, none or all of the tunnels comprising another aggregated tunnel. Therefore, an aggregated tunnel used to send one information packets may or may not be same as the aggregated tunnel used to send another information packet.

Figure 3:
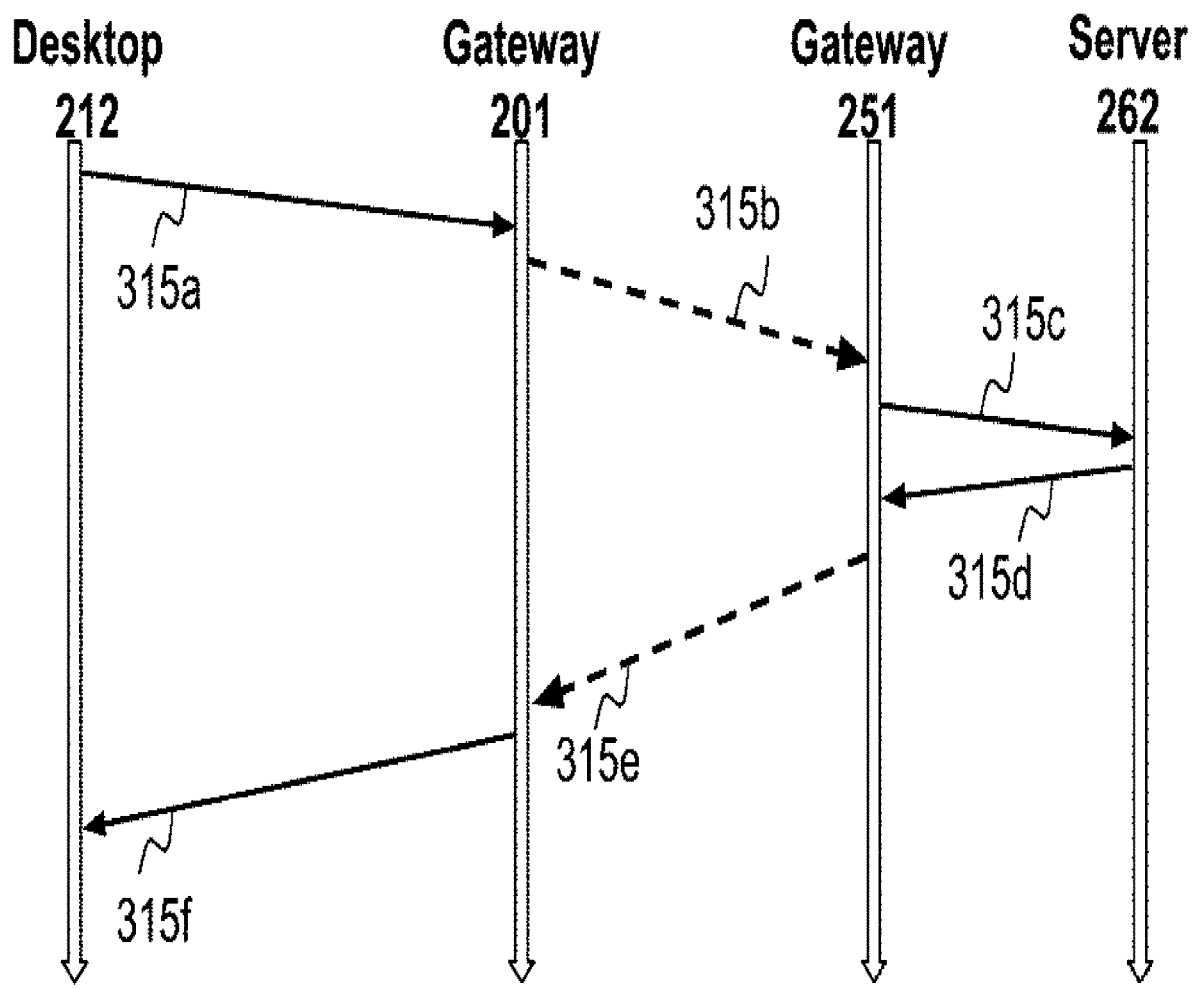
FIG. 3 illustrates a sequence diagram according to one of the embodiments of the present invention.
Figure 8:
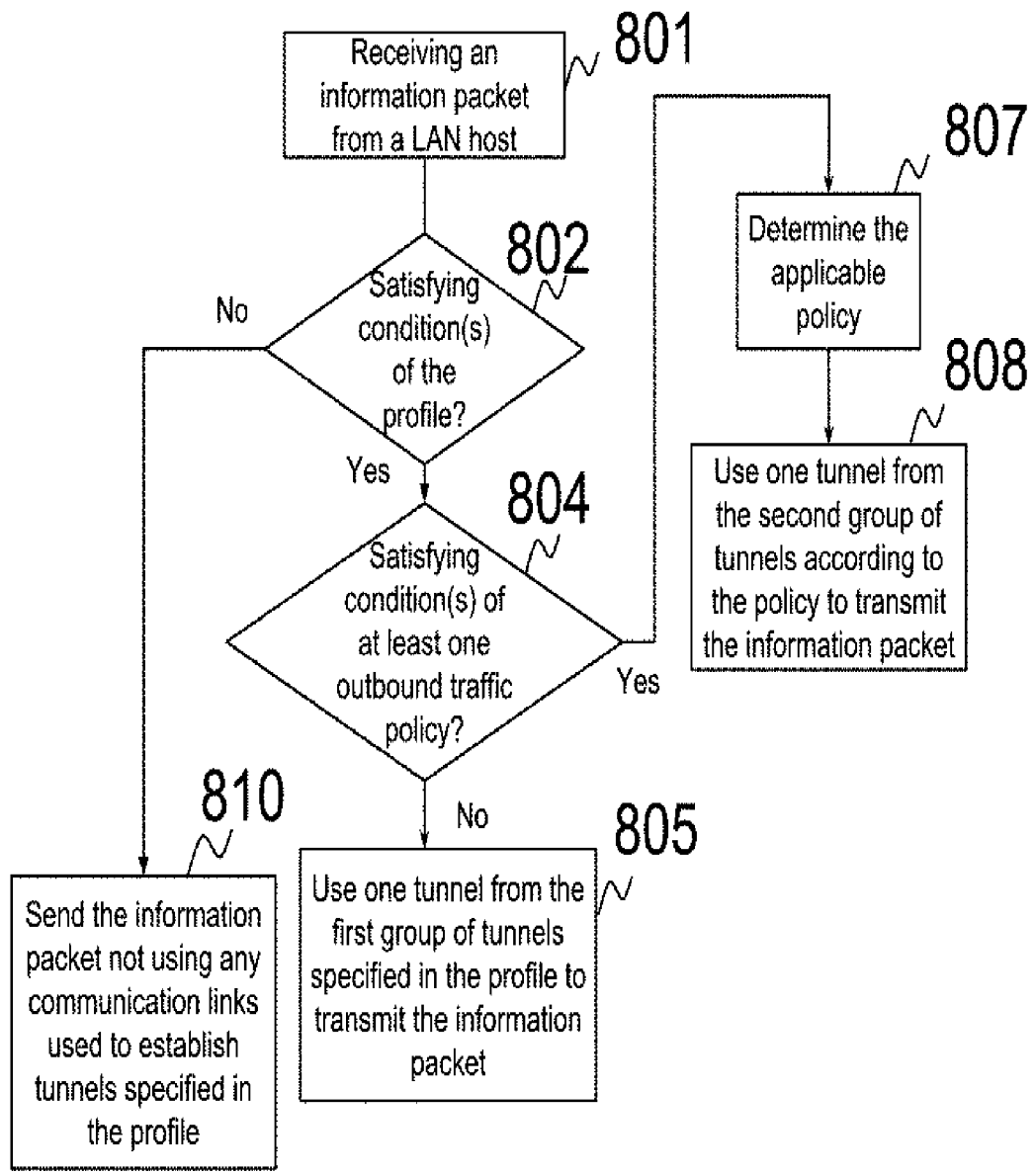
FIG. 8 illustrates a flowchart demonstrating steps performed at node according to one of the embodiments of the present invention.

FIG. 3, FIG. 6, FIG. 7 and FIG. 8 together illustrate one of the embodiments according to the present invention. FIG. 8 is a flowchart that illustrates steps performed at a network node, such as gateway 201, to process an information packet. FIG. 3 is a sequence diagram illustrating the communication sequence among different hosts and nodes, such as gateway 201 and gateway 251 and hosts connected to their LAN interfaces. In this embodiment, the number of aggregated tunnel established for transmitting and receiving information packets between two network nodes is one. This single aggregated tunnel is formed according to a single tunnel-profile which is the first tunnel-profile. This single tunnel-profile can comprise more than one outbound traffic policies. Each outbound traffic policy corresponds to a different group of tunnels, wherein the least number of tunnels in a group is one.

When a gateway receives an information packet from one of its LAN hosts, it determines if the information packet satisfies conditions of the profile. If profile-condition(s) is satisfied, the gateway selects a first group of tunnels according to the profile satisfied. Gateway 201 then determines if the information packet satisfies condition(s) for at least one outbound traffic policy. For illustration purpose, the same aggregated tunnel is used in steps 315b and 315e for transmission of packets between gateway 201 and gateway 251. When a host such as desktop computer 212 from LAN 211 communicates with server 262 from LAN 261, the desktop computer 212 first sends the first information packet to gateway 201 at step 315a. After gateway 201 receives the first information packet from desktop computer 212 at step 801, processing unit 600 of gateway 201 determines if the information packet satisfies all profile condition(s) of the first profile at step 802. In this embodiment, the profile condition is destination address of the information packet which is a IP packet. A first group of tunnels 791a, 791b and 791c used when the first profile is selected. If condition(s) of the first profile is satisfied, then in step 804, processing unit 600 further checks if the first information packet satisfies condition(s) of at least one outbound traffic policy corresponding to the first profile. If the information packet does not satisfy any outbound traffic policy, then at step 805, processing unit 600 selects a first group of tunnels specified in the first profile to send the information packet to gateway 251.

If the information packet satisfies condition(s) of at least one outbound traffic policy then at step 807 processing unit 600 determines the applicable outbound traffic policy to be applied to the information packet. If there are more than one policy satisfied, the first node then selects one policy among all applicable outbound traffic policies for the information packet. Selection of one policy from more than one applicable outbound traffic policies is based on priority. The first node then uses a second group of tunnels 791a, 791b and 791c corresponding to the one determined outbound traffic policy to sends the information packet to gateway 251. There is no restriction that one particular group of tunnels must comprise the same or different tunnels of another group of tunnels. If condition(s) of the first profile is not satisfied by the information packet, processing unit 600 of the first node 201 then selects a group of communication links which includes communication links that are not used to establish tunnels specified in the first profile. There is also no restriction for this group of communication links to include one or more communication links used to establish tunnels specified in the first profile.

Figure 9:
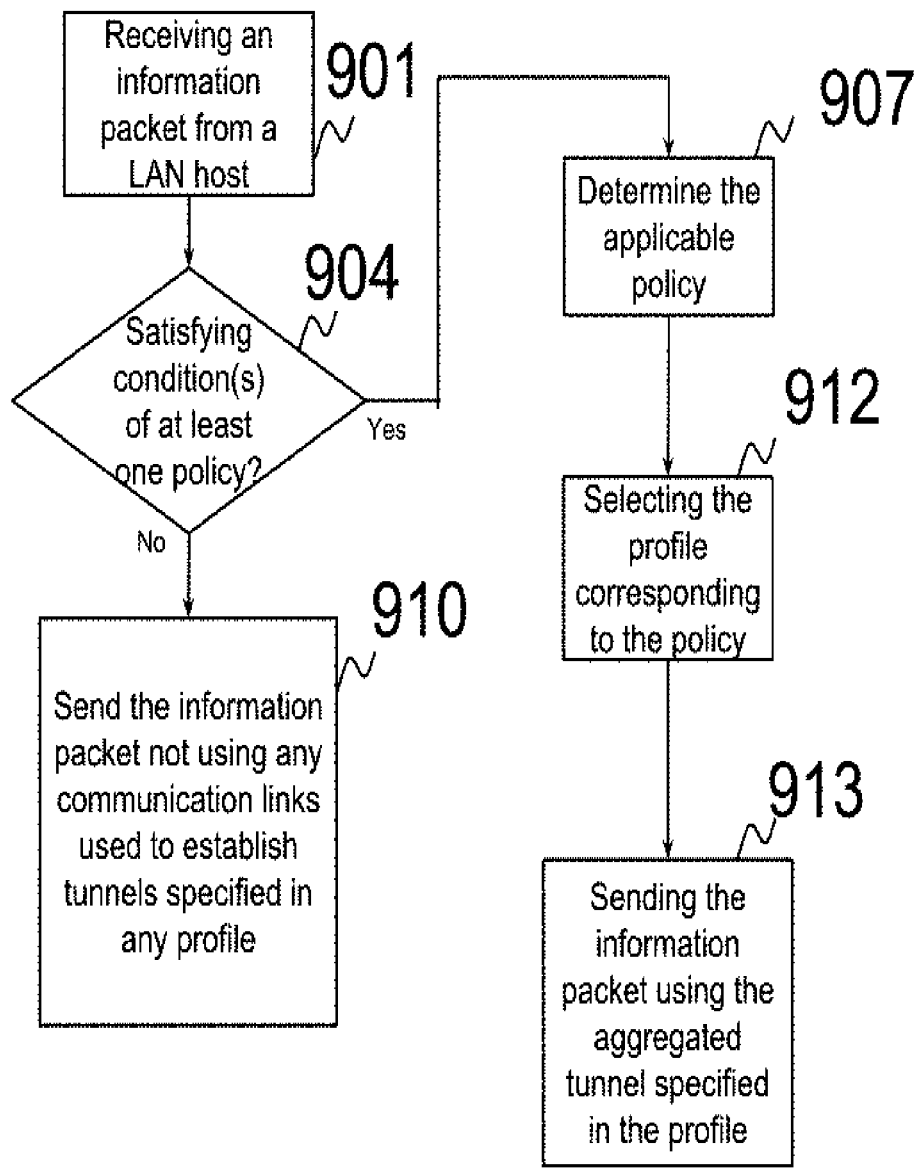
FIG. 9 illustrates a flowchart demonstrating steps performed at node according to one of the embodiments of the present invention.

Compared to the previous embodiment where FIG. 3, FIG. 6, FIG. 7 and FIG. 8 are viewed in conjunction, FIG. 2, FIG. 3, FIG. 6 and FIG. 9 together illustrate another embodiment of the present invention where a single aggregated tunnel is used to send and receive information packets between two nodes. In this particular embodiment the aggregated tunnel being is selected from a plurality of aggregated tunnels established between the two nodes. Each aggregated tunnel and the groups of communication links comprised in it is specified in a different tunnel-profile. Each aggregated tunnel also has a single outbound traffic policy corresponding to it. An aggregated tunnel is used to send an information packet when the outbound traffic policy corresponding to that aggregated tunnel is selected for that information packet. FIG. 9 illustrates steps performed at a node, such as gateway 201, to process an information packet. FIG. 3 is a sequence diagram illustrating the communication sequence among different hosts and nodes, such as gateway 201 and gateway 251 and hosts connected to their LAN interfaces.

For illustration purpose, the same aggregated tunnel is used in steps 315b and 315e for transmission of packets between gateway 201 and gateway 251. When a host such as a desktop computer 212 from LAN 211 needs to send an information packet to server 262 of LAN 261, it first sends the information packet to gateway 201 at step 315a. After gateway 201 receives the information packet from desktop computer 212 at step 901, processing unit 600 of gateway 201 determines if the information packet satisfies at least one outbound traffic policy at step 904. If the information packet satisfies at least one outbound traffic policy, processing unit 600 determines the outbound traffic policy to be applied to the information packet at step 907. If there are more than one outbound traffic policies satisfied, gateway 201 then selects one outbound traffic policy among all applicable outbound traffic policies for the information packet. The selection of one outbound traffic policy is based on priority. At step 912, processing unit 600 determines the aggregated tunnel that the selected outbound traffic policy corresponds to. At step 913, processing unit 600 uses the aggregated tunnel specified in the selected outbound traffic policy to send the information packet to gateway 251. As aggregated tunnels are created according to their corresponding profiles, alternatively, the aggregated tunnel is selected in step 912 when processing unit 600 uses its corresponding profile specified in the selected outbound traffic policy. If the information packet does not satisfy any outbound traffic policy, then at step 910, processing unit 600 uses a group of communication links which includes communication links not specified in the first profile. There is also no restriction for this group of communication links to use one or more communication links specified in the first profile.

Figure 4:
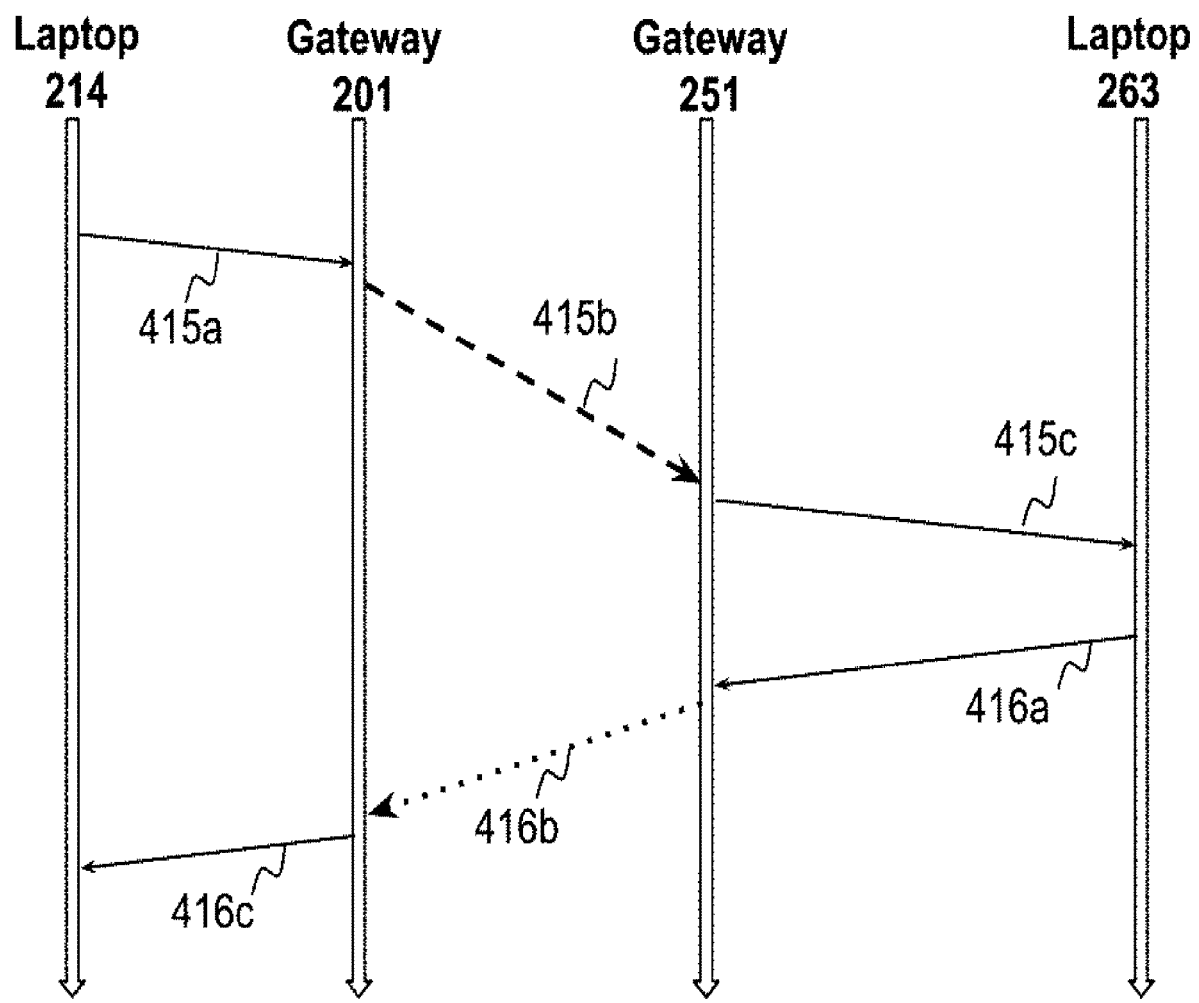
FIG. 4 illustrates a sequence diagram according to one of the embodiments of the present invention.

FIG. 2, FIG. 4, FIG. 6 and FIG. 9 together illustrate another embodiment of the present invention where information packets are sent through a plurality of aggregated tunnels from a first network node to a second network node, wherein the plurality of aggregated tunnels are established between the first network node and the second network node. FIG. 4 is a sequence diagram illustrating the communication sequence among different hosts and nodes, such as gateway 201 and gateway 251 and hosts connected to their LAN interfaces. FIG. 9 illustrates steps performed at a node, such as gateway 201, to process an information packet received from one of its LAN hosts. In this embodiment, the number of aggregated tunnels established between two nodes for transmitting and receiving information packets can be more than one. Therefore, more than one aggregated tunnel can be used by the gateways to send and receive information packets concurrently. Each aggregated tunnel and the tunnels comprised in each aggregated tunnel is specified in a different tunnel-profile. Each aggregated tunnel also has a single outbound traffic policy corresponding to it. An aggregated tunnel is used to send an information packet when the outbound traffic policy corresponding to that aggregated tunnel is selected for that information packet.

For illustration purpose, two different aggregated tunnels are used in steps 415b and 416b for transmission of packets between gateway 201 and gateway 251. When a host such as a laptop computer 214, which is connected to a LAN interface of gateway 201, communicates with laptop computer 263 of LAN 261, laptop computer 214 sends a first information packet to gateway 201 in step 415a. Gateway 201 receives the first information packet from laptop computer 214 at step 901. At step 904, processing unit 600 determines if the first information packet satisfies condition (s) of at least one outbound traffic policy. If at least one outbound traffic policy is satisfied, then at step 907, processing unit 600 determines the outbound traffic policy to be applied to the information packet. If there are more than one policy satisfied, the first node then selects one policy among all applicable outbound traffic policies for the information packet. Selection of one outbound traffic policy from more than one applicable outbound traffic policies is based on priority. Then at step 912, processing unit 600 determines the first profile that the selected outbound policy corresponds to. Then at step 415b and step 913, processing unit 600 uses a tunnel from the first group of tunnels specified in the determined profile to send the encapsulated first information packet to gateway 251. This first group of tunnels forms the first aggregated tunnel as per the first profile. If the information packet does not satisfy any outbound traffic policy, then at step 910, processing unit 600 selects a communication link from a group of communication links, which may include communication links not specified in the first profile, to send the encapsulated first information packet to gateway 251.

In another variant of this embodiment, there is also no restriction for the group of communication links to be used when the information packet does not satisfy any profile, to use one or more communication links specified in the first profile used by gateway 201 to establish the first aggregated tunnel. When laptop computer 263 needs to communicate with laptop computer 214, laptop computer 263 sends the second information packet to gateway 251 in step 416a. When gateway 251 receives the second information packet at step 901, processing unit 600 of gateway 251 then performs similar steps processing unit 600 of gateway 201 performed for the first information packet. If an outbound traffic policy can be applied to the second information packet, processing unit 600 then uses a second aggregated tunnel to send the encrypted second information packet to gateway 201 in step 416b according to the outbound traffic policy. This second aggregated tunnel is specified in a profile that corresponds to the applied policy. There is no restriction for one node in using the same aggregated tunnels established between the two nodes, to send all information packets to the other node. Therefore, the second aggregated tunnel used in step 416b may or may not be same as the first aggregated tunnel used in step 415b. There is also no restriction for one group of communication links comprised in one aggregated tunnel to include one or more communication links comprised in another aggregated tunnel.

There is no limitation that the information packets exchanged between two gateways must be originated from a LAN host, they can also be originated from the gateways. For example, packets carrying link-control or route-update information exchanged between two or more gateways will also go through the same selection mechanism for groups of communication links.

In one of the embodiments of the present invention, a first group of end-to-end connections or tunnels are specified in a profile. Here tunnel is a virtual point-to-point connection, between a source-node and a destination-node, which may include one or more communication links and one or more intermediate nodes. In one of the embodiments of the present invention a tunnel between a source node and a destination node is a virtual private network (VPN) tunnel. With reference to FIG. 2, gateway 201 connects to interconnected network 299 using four communication links and gateway 251 connects to interconnected network 299 using two communication links. Therefore, when an information packet is to be sent from a host in LAN 211 to a host in LAN 261, there are eight possible combinations through which tunnels can be established. Out of these eight combinations, for example, six are used to establish tunnels, namely tunnel A, tunnel B, tunnel C, tunnel D, tunnel E and tunnel F. These tunnels are established using communication links 221 and 231, communication links 221 and 232, communication links 222 and 231, communication links 222 and 232, communication links 223 and 231 and communication link 223 and 232 respectively. Tunnels A-F are capable of being aggregated to form a first aggregated tunnel. Tunnels are not established using communication link 224 in this example.

In another embodiment of the present invention, a gateway can contain more than one profiles. In this embodiment, for example, a second profile is used by gateway 201 to connect to gateway 252. Gateway 201 connects to interconnected network 299 using four communication links and gateway 252 connects to interconnected network 299 using two communication links. Therefore, when an information packet is to be sent from a host in LAN 211 to a host in LAN 261, there are eight possible combinations through which tunnels can be established. Out of these eight combinations, four are used to established tunnels which are tunnel G, tunnel H, tunnel I and tunnel J. These tunnels are established using communication links 221 and 234, communication links 221 and 235, communication links 222 and 234, and communication links 222 and 235 respectively. Tunnels G-J are capable of being aggregated to form a second aggregated tunnel. In this embodiment tunnels are not established with gateway 252 using communication link 223 and communication link 224. In this embodiment, the first aggregated tunnel comprising tunnels A-F and the second aggregated tunnel comprising tunnels G-J both are used by gateway 201 to communicate with different gateways.

FIG. 5A, FIG. 5B, FIG. 5C, and FIG. 5D illustrate examples of how different tunnel-profiles and outbound traffic policies are defined according to various embodiments of the present invention.

A first profile 510 is shown in FIG. 5A. It would be known to those skilled in the art that profiles may be defined by specifying a local ID 511, a remote ID 512, an encryption standard 514 and a shared key 515 as shown in FIG. 1. When an information packet is received by gateway 201 from a LAN host, processing unit 600 determines whether the information packet belongs to first profile 510 according to the destination address of the information packet. For example, if the destination is a device accessible through gateway 251, the information packet belongs to first profile 510. If the information packet belongs to first profile 510, WAN interfaces 1, 2 and 3 of gateway 201 are used to establish tunnels with gateway 251 according to row 513.

For examples, a first group of communication links consisting of communication links 221, 222 and 223 connecting to WAN interfaces 1, 2 and 3 respectively are used to create the tunnels.

FIG. 5A is viewed in conjunction with FIG. 8 for better understanding of the embodiments. When an information packet is received in step 801, the information packet is examined to determine whether it belongs to first profile 510 at step 802. If it belongs to first profile 510, then in step 804, the information packet is then further examined to determine whether the information packet satisfies at least one outbound traffic policy of first profile 510. In step 807, if the information packet is a File Transfer Protocol (FTP) packet, the information packet satisfies first outbound traffic policy 518 as the condition for first policy 518 is FTP as illustrated in condition row 516. Therefore, the determined outbound traffic policy in step 807 is first outbound traffic policy 518. In step 808, a second group of tunnels established using communication link 222 connecting to WAN interface 2 as illustrated in local WAN selection row 513 of first outbound traffic policy 518, is then selected. As there is only one information packet, only one of the tunnels of the second group of tunnels is then selected to send the information packet. In the case of multiple information packets belonging to the same FTP session, there is no limitation that one particular tunnel must be used for all of the multiple information packets. Different tunnels of the second group of tunnels are allowed to be used for the multiple information packets. Encryption standard used for the information packet is AES 256, as illustrated in encryption standard row 514 of first outbound traffic policy 518, and a shared key for encryption is "unhappy", as illustrated in shared key row 515 of first outbound traffic policy 518.

Alternatively, if the information packet is a VoIP packet, then the information packet satisfies second outbound traffic policy 519 as the condition for second outbound traffic policy 519 is VoIP, as illustrated in condition row 516. Therefore, the determined outbound traffic policy is step 807 is second outbound traffic policy 519. The second group of tunnels which is established using communication links 222 and 223 connecting to WAN interface 2 and WAN interface 3 respectively, will then be used to transmit the information packet in step 808, as illustrated in local WAN selection row 513 of second outbound traffic policy 519. In one variance, in addition of the second tunnel group, an outbound traffic policy specifies that a third group of communication links is used to send the information packet in case none of the tunnels of the first or second tunnel group is neither able or not preferred to send the information packet, such as in the case of network failure and network congestion respectively. There is no restriction on the first group of communication links that they may or may not be tunnels. For illustration purpose, the third group of communication links comprises of communication links 221 and 223. There is no limitation that only one or two tunnel groups can be specified in an outbound traffic policy.

It is possible that not all policy information in row 514-516 is present. a default policy information of its corresponding profile is applied to the information packet. For example, since encryption standard and shared key have not been specified in second outbound traffic policy 519, default encryption standard AES 128 and default shared key "happy", as illustrated in encryption standard row 514 and shared key row 515 of default 517 respectively, are applied to the information packet.

Alternatively, if the information packet is neither an FTP packet nor a Voice over Internet Protocol (VoIP) packet, it does not fall under any outbound traffic policy and the default outbound traffic policy information shown in default 517 are applied to the information packet. For illustration purpose, the first group of communication links, consisting of communication links 221, 222 and 223, is selected in step 805. One communication link of the first group of communication links is then used to send the information packet. Encryption standard used for the information packet is AES 128, as illustrated in encryption standard row 514 of default 517, and a shared key for encryption is "happy", as illustrated in shared key row 515 of default 517. According to one of the embodiments of the present invention, when a profile comprises more than one outbound traffic policy, priorities are assigned to the more than one outbound traffic policy.

It is possible that an information packet satisfies conditions for more than one outbound traffic policy. In order to determine which outbound traffic policy should be applied to the information packet, priorities of the outbound traffic policies are determined. The outbound traffic policy with the highest priority is applied to the information packet. For illustration purposes, priority level row 530 shows that second outbound traffic policy 519 has highest priority, and first outbound traffic policy 518 has lowest priority. If an information packet satisfies conditions for both first outbound traffic policy 518 and second outbound traffic policy 519, in step 807, second outbound traffic policy 519 is selected because second outbound traffic policy 519 has higher priority than first outbound traffic policy 518.

Figure 5B:
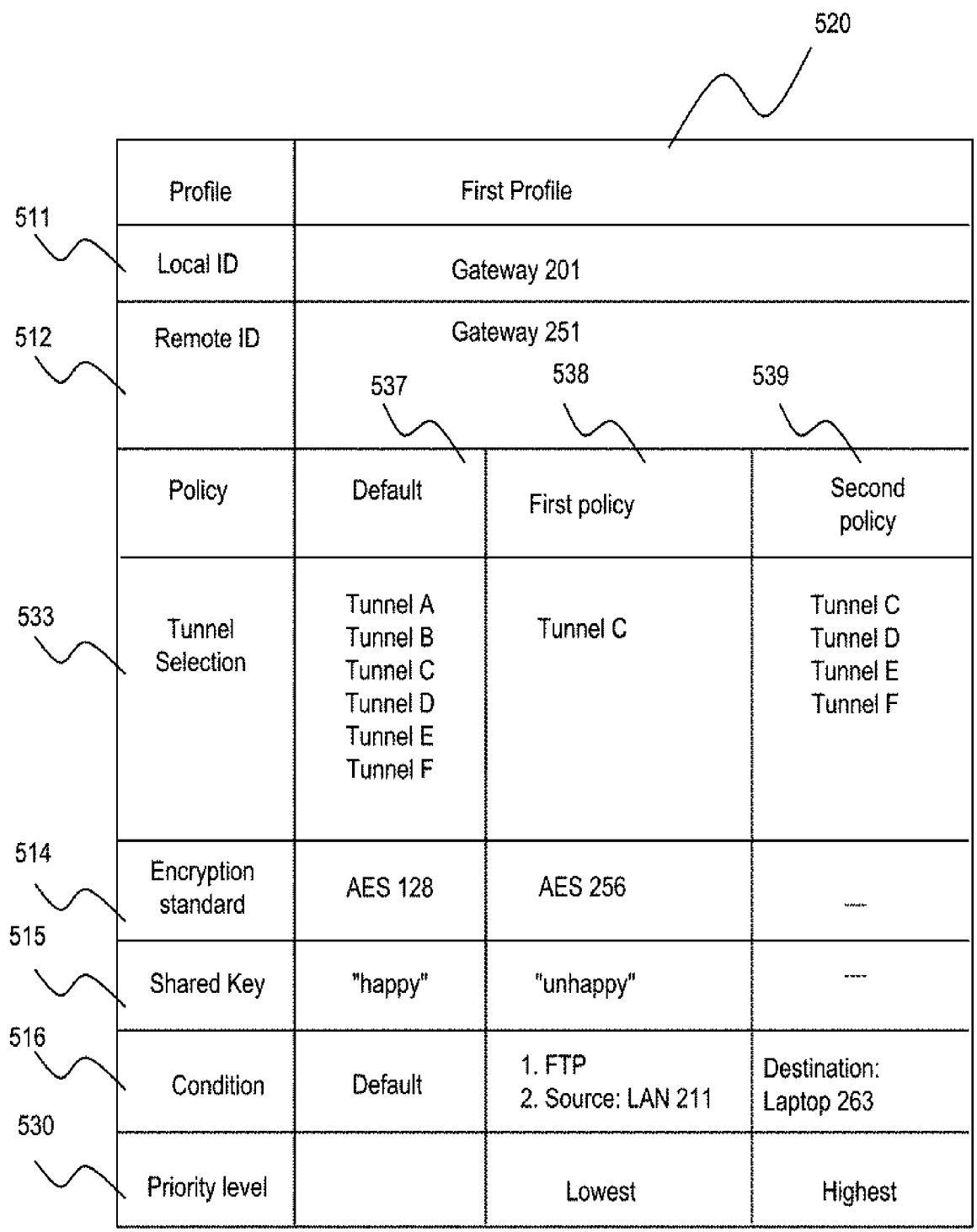
FIG. 5B illustrates a table of how different profiles and policies are defined according to one of the embodiments of the present invention.

According to one of the embodiments, as illustrated in FIG. 5B, tunnels are specified in the profile. First profile 510 comprises tunnel selection row 533 instead of local WAN selection row 513 of FIG. 5A. Default tunnels specified for first profile 510 in default 537 are tunnel A, tunnel B, tunnel C, tunnel D, tunnel E, and tunnel F. If an information packet satisfies conditions for first policy 538, tunnel C is used in step 808. If an information packet satisfies conditions for second policy 539, tunnel C, tunnel D, tunnel E, and tunnel F are selected in step 808, out of which one tunnel is used to send one information packet. A first condition for first policy 538 is satisfied when an information packet is an FTP packet, and a second condition for first policy 538 is satisfied if source of the information packet is in LAN 211. In one variant, if an information packet satisfies any of the conditions corresponding to a policy, the policy can be applied to the information packet. In another variant, all of the corresponding conditions of a policy need to be satisfied before the policy can be applied to an information packet. In the case that conditions for both first policy 538 and second policy 539 are satisfied, tunnel C, tunnel D, tunnel E, and tunnel F is selected because second policy 539 has a higher priority.

According to one of the embodiments, as illustrated in FIG. 5C, communication links of both gateway 201 and gateway 251 are specified in the profile. WAN interfaces 5 and WAN interface 6 of gateway 251 are used to establish tunnels with gateway 201 according to remote WAN selection row 544. For example, a group of communication links consisting of communication links 231 and 232 connecting to WAN interfaces 5 and 6 respectively are used to create the tunnels. An information packet that belongs to first profile 510 but does not satisfy conditions of first outbound traffic policy 548 or second outbound traffic policy 549, may be transmitted through any combination of tunnels connected to WAN interface 1, WAN interface 2 or WAN interface 3 and received through any combination of WAN interface 5 and WAN interface 6. When an information packet is an FTP packet, it satisfies conditions of first outbound traffic policy 548, WAN interface 5 and WAN interface 6 are selected as shown in local WAN selection row 513 and remote WAN selection row 544 respectively. When information packets are VoIP packets and/or are destined to laptop 263, the VoIP packets satisfy conditions of second outbound traffic policy 549 and tunnels established using any combination of communication links 222 and 223 with communication links 231 and 232 are selected, out of which one tunnel is used for transmitting the information packet, as illustrated in local WAN selection row 513 and remote WAN selection row 544 respectively. When several information packets belonging to first profile 510 are to be transmitted, the information packets may be transmitted through the one or more communication links specified in default 547 or specified in a corresponding outbound traffic policy by using load balancing technique.

According to one of the embodiments, first profile 510 may comprise remote WAN selection row 544 and may not comprise local WAN selection row 513. The communications links at gateway 201 may then be selected according to their performance, according to their availability, or packets may be transmitted through all three communication links using load balancing technique. According to one of the embodiments of the present invention, performance of each tunnel is evaluated by processing unit 600. Performance may be evaluated by sending evaluation packets through the communication links or tunnels. For example, latency of each tunnel between gateway 201 and gateway 251 is evaluated. An outbound traffic policy may be defined such that a condition is satisfied if an information packet is a VoIP packet, and tunnels with latency lower than 500 milliseconds are selected for the information packet. In case there are no communication links or tunnels with latency lower than 500 milliseconds, communication links or tunnels with the lowest latency may be selected. Therefore, communication links or tunnels may not be predefined in the outbound traffic policy and may be dynamically added or removed according to the performance of tunnels. It would be known to those skilled in the art that latency of connections is preferred to be lower than about 500 milliseconds in order to achieve proper quality of the VoIP session. Tunnels may also be selected periodically in an outbound traffic policy according to their performance. Therefore, tunnels specified in an outbound traffic policy may be selected dynamically or periodically by processing unit 600 based on their performance. Conditions for the outbound traffic policies may be based on latency requirement of information packets.

As illustrated in FIG. 5D, more than one profile may be defined at gateway 201. The first profile 553 defined at gateway 201 is used for communication between gateway 201 and gateway 251. In addition, a second profile 554 is also defined at gateway 201 for communication between gateway 201 and gateway 252. FIG. 5D is viewed in conjunction with FIG. 9 for better understanding of the embodiment. When an information packet is received in step 901, the information packet is examined to determine whether it satisfies condition(s) of at least one outbound traffic policy in step 904.

In one variant, all conditions specified in row 516 need to be satisfied by the information packet for their corresponding outbound traffic policy to be satisfied.

In one variant, the manufacturer, administrator or user have the freedom to define whether at least one or all of the predefined conditions corresponding to an outbound traffic policy need to be satisfied for that outbound traffic policy to be satisfied. In this variant, the manufacturer, administrator or user also have the freedom to custom-select the conditions. For illustration purpose, four conditions have been defined in row 516. In this particular variant, first, third and fourth conditions need to be satisfied for the first outbound traffic policy to be satisfied, whereas first, second, third and fourth conditions need to be satisfied for the second policy to be satisfied. If conditions of the first outbound traffic policy are satisfied but conditions of the second outbound traffic policy are not satisfied, then in step 907 processing unit 600 determines the first outbound traffic policy to be applied to the information packet. In this embodiment each outbound traffic policy correspond to a single profile. Therefore, when the first outbound traffic policy is selected, the first profile 510 is used in step 912. According to the first profile, local ID gateway 201, remote ID gateway 251, encryption standard AES 256 and shared key "happy" is used as shown in rows 511, 512, 514 and 515 respectively. Additionally, as specified in the first profile, tunnel I and tunnel J are used to send the information packet. Alternatively, if conditions of both first and second outbound traffic policy are satisfied, the outbound traffic policy with the higher priority is selected by processing unit 600. As shown in row 530, the second outbound traffic policy is the outbound traffic policy with higher priority than the first outbound traffic policy. So, in this case the second outbound traffic policy is selected. When the second outbound traffic policy is selected, the second profile is used to send the information packet as the second profile corresponds to the second outbound traffic policy. According to the second profile, local ID gateway 201, remote ID gateway 252, encryption standard AES 128 and shared key "unhappy" is used as shown in rows 511, 512, 514 and 515 respectively. Additionally, as specified in the second profile, tunnel I and tunnel J are used to send the information packet.

Conditions for outbound traffic policies are not limited to the conditions illustrated in FIG. 5A, FIG. 5B, FIG. 5C and FIG. 5D. FIG. 5A, FIG. 5B, FIG. 5C and FIG. 5D are not meant to limit the scope of the invention and are only illustrations of exemplary embodiments.

There is no restriction on using the same encryption standard and/or shared key of one outbound traffic policy as the encryption standard and/or shared key of another outbound traffic policy.

The scope of the embodiment is not limited to determining a profile according to only destination address. Information comprised in each profile are not limited to local WAN selection, encryption standard and shared key. It would be apparent to those skilled in the art that additional information used to establish an aggregated tunnel can be specified in a profile.

Figure 10A:
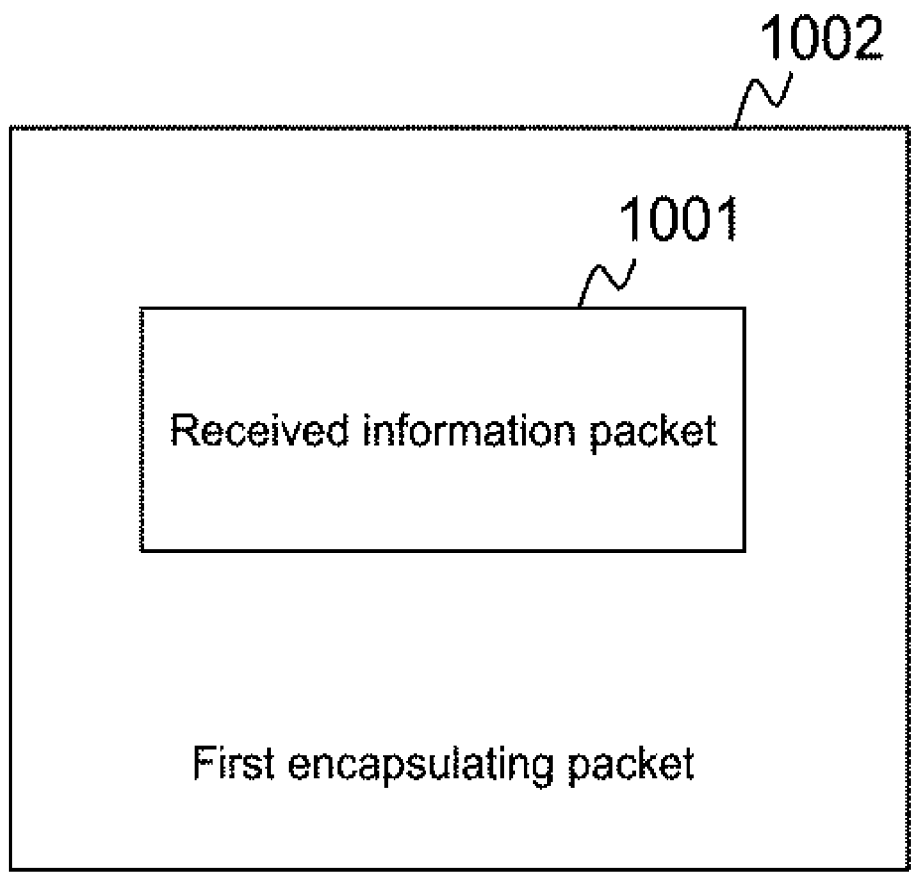
FIG. 10A illustrates a block diagram for encapsulating an information packet received at a gateway according to one of the embodiments of the present invention.
Figure 10B:
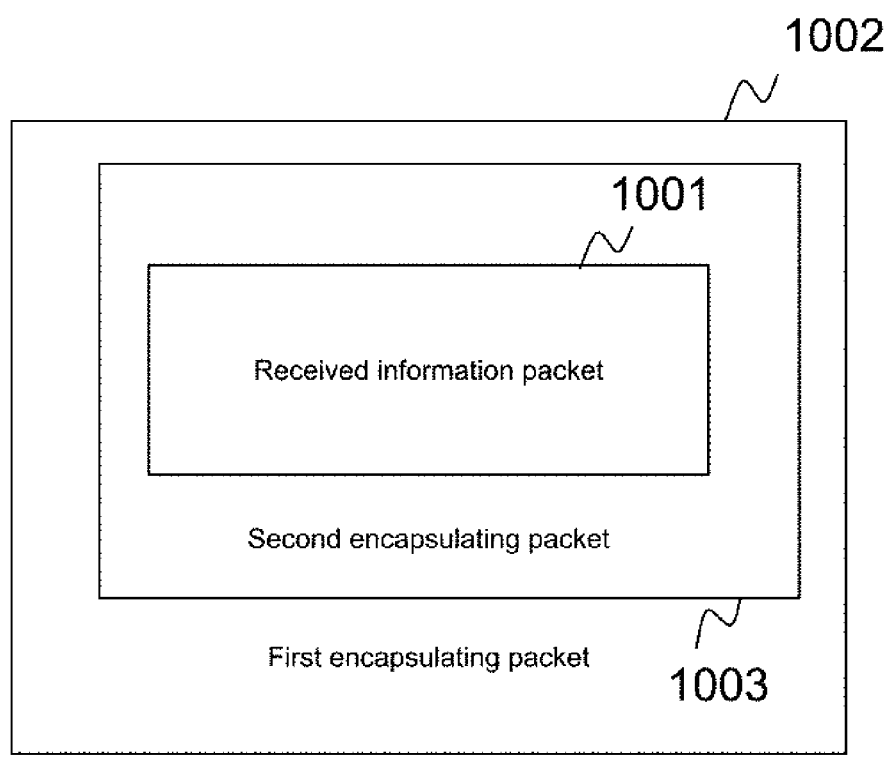
FIG. 10B illustrates a block diagram for encapsulating an information packet received at a gateway according to one of the embodiments of the present invention.

FIG. 10A and FIG. 10B illustrate encapsulating an information packet received at gateway 201. According to prior art, as illustrated in FIG. 10A, received information packet 1001 is encapsulated in a first encapsulating packet 1002. In one of the embodiments of the present invention, as illustrated in FIG. 10B, the received information packet is encapsulated in a second encapsulating packet 1003 according to a second encryption standard. Second encapsulating packet 1003 is then encapsulated in first encapsulating packet 1002 according to the first encryption standard. The first encryption standard may or may not be the same as the second encryption standard.

In one variant, the first encryption standard is determined according to the encryption standard specified in the profile the received information packet belongs to. The second encryption standard is determined according to the encryption standard specified in a determined outbound traffic policy satisfied by the received information packet.

The purpose of encapsulating the information packet in second encapsulating packet 1003 is to provide higher security while the information packet travels through the tunnel(s). In one variant, instead of being encapsulated in the second encapsulating packet 1003, received information packet 1001 is encrypted with a shared key, and then encapsulated in first encapsulating packet with a different shared key.

According to one of the embodiments of the present invention, gateway 201 sends gateway 251 information about one or more outbound traffic policies corresponding to a profile. Gateway 251 then stores the outbound traffic policies corresponding to the profile and apply the outbound traffic policies to information packets satisfying conditions of the outbound traffic policies. For example, when tunnel A, tunnel B, tunnel C, tunnel D, tunnel E, and tunnel F are established with gateway 251 according to the first profile 510, outbound traffic policies corresponding to first profile 510 are also applied to packets transmitted by gateway 251 to gateway 201. When an information packet destined to device accessible through gateway 201 arrives at gateway 251, processing unit 600 of gateway 251 determines whether the information packet satisfies conditions of at least one outbound traffic policy corresponding to the first profile 510. If the protocol of the information packet is determined to be FTP, the condition of first outbound traffic policy 518 is satisfied. Since communication link 222 is specified in first outbound traffic policy 518, gateway 251 uses tunnel C and/or tunnel D for transmitting the information packet. Alternatively, one or more tunnels may be specified in first outbound traffic policy 518, such that gateway 251 and gateway 201 use the one or more tunnels for exchanging FTP packets between each other.

In one variant, a condition for an outbound traffic policy is based on time of the day.

For illustration purpose, in FIG. 5D row 516, the fourth outbound traffic policy condition is the time of day to be within a specific range of hours for the information packets to be allowed to be sent. For the first outbound traffic policy to be satisfied, the time of day needs to be between 8 AM to 8 PM. For the second outbound traffic policy to be satisfied, the time of day can be any time. This condition is useful as different data type may have different priority according to the time of the day.

The invention claimed is:

1. A method of sending a plurality of information packets from a first network node to a second network node through at least one aggregated tunnel, wherein the at least one aggregated tunnel is established between the first network node and the second network node, comprising:
 (a) determining whether an information packet in the plurality of information packet is to be sent according to profile conditions of the at least one aggregated tunnel; wherein the profile conditions are in a profile;
 (b) when all of the profile conditions are satisfied:
  (i) determining whether all conditions of a policy are satisfied; wherein the policy is in a plurality of policies in the profile;
  (ii) when all of the conditions of the policy are satisfied, selecting the policy and sending the information packet through a first tunnel in a first group of tunnels according to the policy; and
  (iii) when at least one of the conditions of at least one of the policies in the plurality of policies is not satisfied, sending the information packet through a second tunnel in a second group of tunnels according to the profile; and
 (c) when at least one of the profile conditions is not satisfied, sending the information packet through at least one network interface of the first network node; wherein: the plurality of policies are in the profile:
 the at least one aggregated tunnel comprise is comprised of the first group of tunnels and the second group of tunnels;
 each of the first group of tunnels and the second group of tunnels comprise a plurality of tunnels;
 the first tunnel in the first group of tunnels and the second tunnel in the second group of tunnels are in the plurality of tunnels;
 the sending of the information packet through the first tunnel in the first group of tunnels at step (b)(ii) corresponds to the policy;
 the sending of the information packet through the second tunnel in the second group of tunnels at step (b)(iii) corresponds to the profile; and
 at least one of the first network node and second network node has at least two network interfaces.

2. The method of claim 1, wherein the policy selected at step (b)(ii) has the highest priority among the plurality of policies when all respective conditions of the policies in the plurality of policies are satisfied.

3. The method of claim 1, wherein the profile condition is comprised of a local ID, a remote ID, an encryption standard, and a shared key.

4. The method of claim 1, wherein the plurality of policies is entered by a user or retrieved from a remote server.

5. The method of claim 1, wherein the policy is satisfied when all of the conditions of the policy are satisfied.

6. The method of claim 5, wherein the conditions are selected from a group consisting of a source address of the information packets, a destination address of the information packets, and a payload of the information packets.

7. The method of claim 1, wherein:
 the first network node comprises a plurality of network ports; and
 the at least two tunnels are established using communication links connected to the network ports.

8. The method of claim 1, wherein:
 the first network node comprises a plurality of cellular communication modules; and
 the at least two tunnels are established using network interfaces provided by the plurality of cellular communication modules.

9. The method of claim 1, further comprising:
 (d) selecting the tunnel in the first group of tunnels and the tunnel in the second group of tunnels in the at least one aggregated tunnel for sending each of the information packets; wherein step (d) is performed in step (b).

10. A system, comprising:
 a first network node;
 a second network node;
 at least one aggregated tunnel established between the first network node and the second network node;
 wherein the first network node comprises:
  at least one first network interface;
  at least one first non-transitory computer readable storage medium storing program instructions; and
  at least one first processing unit;
 wherein the second network node comprises:
  at least one second network interface;

at least one second non-transitory computer readable storage medium storing program instructions; and at least one second processing unit;

wherein:

the at least one first processing unit is configured to execute the program instructions stored in the at least one first non-transitory computer readable storage medium;

the at least one second processing unit is configured to execute program instructions stored in the at least second non-transitory computer readable storage medium; and the program instructions stored in the at least one first non-transitory computer readable storage medium are configured to send information packets from the first network node to the second network node by:

(a) determining whether an information packet is to be sent according to profile conditions of the at least one aggregated tunnel;

wherein the profile conditions are in a profile;

(b) when all of the profile conditions are satisfied:
  (i) determining whether all conditions of at a policy are satisfied; wherein the policy is in a plurality of policies;
  (ii) when all of the conditions of the policy are satisfied, selecting the policy and sending the information packet through a tunnel in a first group of tunnels according to the policy;
  (iii) when at least one of the conditions of at least one of the policies in the plurality if policies is not satisfied, sending the information packet through a tunnel in a second group of tunnels according to the profile;

(c) when at least one of the profile conditions is not satisfied, sending the information packet through the at least one first network interface of the first network node;

wherein:

the at least one aggregated tunnel comprises the first group of tunnels and the second group of tunnels;

the plurality of policies are in the profile; and at least one of the first network node and second network node has at least two network interfaces.

11. The system of claim 10, wherein the policy selected at step (b)(ii) has the highest priority among the plurality of policies when all respective conditions of the policies in the plurality of policies are satisfied.

12. The system of claim 10, wherein the profile condition is comprised of a local ID, a remote ID, an encryption standard, and a shared key.

13. The system of claim 10, wherein the plurality of policies is entered by a user or retrieved from a remote server.

14. The system of claim 10, wherein the policy is satisfied when all of the conditions of the policy are satisfied.

15. The system of claim 14, wherein the conditions are selected from a group consisting of a source address of the information packets, a destination address of the information packets, and a payload of the information packets.

16. The system of claim 10, wherein:

the first network node comprises a plurality of network ports; and the at least two tunnels are established using communication links connected to the network ports.

17. The system of claim 10, wherein:

the first network node comprises a plurality of cellular communication modules; and the at least two tunnels are established using network interfaces provided by the plurality of cellular communication modules.

18. The system of claim 10, wherein the at least one first non-transitory computer readable storage medium further stores program instructions configured to cause the at least one first processing unit to:

(d) select the tunnel in the first group of tunnels and the tunnel in the second group of tunnels in the at least one aggregated tunnel for sending each of the information packets; wherein step (d) is performed in step (b).

* * * * *